March 31, 1970 R. ROUX ET AL 3,504,217
LASER FLASH TUBES HAVING A HELICOIDAL DISCHARGE PATH OF
SPECIFIC DIMENSIONS
Filed Oct. 9, 1967 2 Sheets-Sheet 1

3,504,217
LASER FLASH TUBES HAVING A HELICOIDAL DISCHARGE PATH OF SPECIFIC DIMENSIONS
Roland Roux and Roger Dumanchin, Orsay, France, assignors to Compagnie Generale d'Electricite, Paris, France
Filed Oct. 9, 1967, Ser. No. 673,765
Claims priority, application France, Oct. 7, 1966, 79,183
Int. Cl. H01j 61/10, 61/34
U.S. Cl. 313—204
6 Claims

ABSTRACT OF THE DISCLOSURE

A laser flash tube having a helicoidal conduit formed by a helicoidal strip disposed between and joined to the outer and inner surfaces respectively of inner and outer concentric cylindrical tubes and characterized by specific relative dimensions and an external coating of light diffusing material.

BACKGROUND OF THE INVENTION

Solid optical laser evacuation requires sources with great luminance and very large flow rates. In general, these are obtained from electrical discharges in a rare gas (mostly xenon) and these sources are usually called flash tubes or simply flashes.

The most important quality required in an optical evacuation source is its output, that is to say, the ratio between the light energy emitted and the electrical energy supplied.

This factor is directly involved in the overall energy output which is the ratio between the energy of the coherent radiation issuing from the laser material and the electrical energy introduced into the flash tube.

If we want to get the greatest possible output from a flash tube for bars with large cross sections, we must, more particularly, resort to structures in which the laser material is placed along the axis of the source. This is true in the case of the helicoidal flash tube, the coaxial flash tube, the ring-coupled linear bundle, or the ring-shaped discharge tube, with the helicoidal flash tube here being a glass or silica tube in the form of a screw, containing the gas to be excited; the coaxial flash tube is a chamber made up here of two glass or silica tubes with different diameters but with the same axis, thus outlining or enclosing a cylindrical volume whose straight-line section is a ring, while the bundle of linear devices here is an assembly of linear flash tubes mounted on two rings.

Applicant has discovered that a laser generator flash tube must meet the following requirements if it is to produce a good output:

(a) The glass or the silica of the chamber must take up the smallest possible portion of the total volume of the light source;

(b) The thickness of the plasma in the radial direction must be small because the excited gas absorbs the radiation which it emits, especially when we deal with flash tubes designed for a laser whose active material is a bar of neodymium glass;

(c) Electrically, the impedance formed by the discharge in the gas must not be too weak because, otherwise, very powerful currents will be circulating in the entire assembly, leading to the rapid destruction of the electrodes and causing a rather considerable energy loss in the resistance of the generator itself.

The tests and calculations performed by the applicant have led to the conclusion that the coaxial source perfectly meets conditions (a) and (b), but that it does not meet requirement (c), whereas the helicoidal source does not meet requirements (a) and (b) and meets condition (c) only rather imperfectly.

We do know of a monobloc flash tube adapted for lasers, operating continuously and consisting of a hollow silica mandrel; in the outside surface of this mandrel, a screw-shaped duct with a flat bottom and a square cross section is formed by means of abrasion; the thickness of the wall separating two consecutive spirals is on the same order as the length of the side of the duct cross section.

The mandrel is covered by an outside silica sleeve which, with the mandrel, describes or constitutes a helicoidal tube whose ends are connected to output tubes representing electrodes, arranged perpendicularly to the axis of the sleeve; the entire assembly is arranged in a cooling system employing water circulation for cooling purposes, inside the mandrel and outside the sleeve. This particular flash tube is quite efficient when the lasers operate continuously and its efficiency essentially depends on the area of the cross section of the helicoidal duct which must be increased and the number of spirals which must be reduced, and it also depends on the efficiency of the cooling system. Applicant has discovered that this known monobloc flash tube is not suitable for lasers operating on the basis of impulses; these lasers bring up problems that are somewhat different from the problems encountered with continually operating lasers. For the case of lasers working on the basis of impulse, the above mentioned requirements (a) and (b) become very important and condition (c) turns out to be of the utmost importance, to the extent that the discharge of the power supply circuits depends essentially on the electric impedance of the tube. In addition to these requirements, we have others, such as the need for limiting the concentration of electric energy per unit of volume of the flash tube; if we fail to do this, the tube might simply explode or it might be destroyed rather quickly. On the other hand, the problem of cooling the tube no longer comes up in this case because of the relatively great thermal inertia of the tube; in contrast to this, cooling is necessary for the laser bar itself in order to prevent any optical disturbances due to the fact that the flash tube heats the bar.

We can thus see that the known tube, made up of a hollow duct in a silica mandrel, is not suitable for lasers operating on the basis of impulse.

SUMMARY OF THE INVENTION

This invention relates to improvements in flash tubes which come in the form of a helicoidal conduit, limited along the ray by two continuous cylindrical surfaces; the spirals here are delimited by a helicoidal wall which joins these two cylindrical surfaces together; these improvements are intended to adapt these flash tubes so that they may be used with impulse-operated lasers.

The flash tube involved in this invention is essentially characterized by the fact that the thickness of the wall delimiting two consecutive spirals and the thickness of the helicoidal conduit along a ray are considerably smaller than the dimension of the conduit running parallel to the axis of the above mentioned cylindrical surfaces. Another feature of this invention resides in the fact that the above mentioned wall consists of a piece of silica or glass with a rectangular cross section, wound up in the form of a spiral around a central mandrel and welded all along its length to the outside surface of this central mandrel and to the inside surface of an outside sleeve.

Another characteristic of this invention involves the following. The flash tube is sealed at its two ends by two transversal plates which have the shape of a ring welded onto the outside sleeve and the inside mandrel; the electrical connections of the tube run across these rings parallel to the common axis of this mandrel and this sleeve.

A further characteristic of this invention is based on the fact that the outside surface of this outside sleeve is covered by a layer of diffusing material, such as magnesium oxide, for example; this layer might have a thickness roughly on the order of the thickness of the sleeve.

According to another characteristic of this invention, the above mentioned helicoidal conduit has a rectangular cross section whose long side is parallel to the common axis of the above mentioned mandrel and sleeve and is at least 3 times the length of the short side.

Additional features and advantages of this invention will be brought out in the detailed specifications below, with reference to the attached figures.

DETAILED DESCRIPTION OF THE INVENTION

Figure 1:
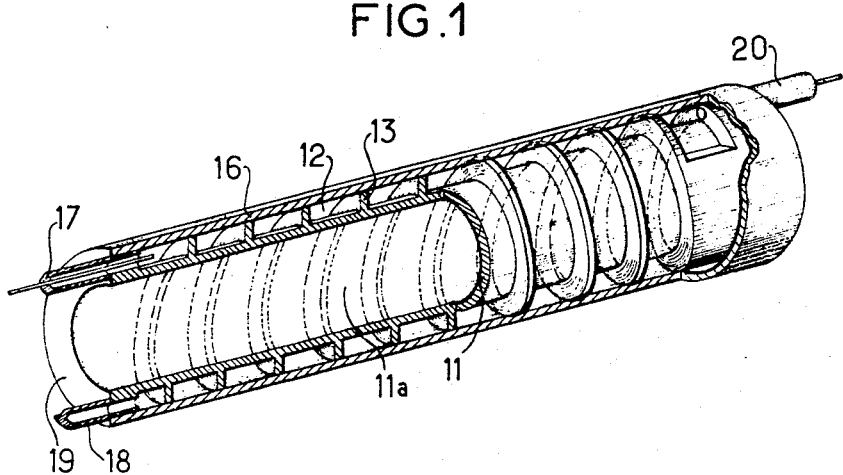
FIGURE 1 is a partial axial cross section view of a flash tube, as involved in this invention.

In FIGURE 1, we can see a central mandrel 11 provided with a central recess 11a in which we find the active laser material (not shown in the figures). The outside surface of mandrel 11 is provided with a helcoidal duct 12 which has a flat bottom and which is delimited by a wall 13. In the case of FIGURE 1, duct 12 has been produced by means of abrasion and we have left shoulders or ridges such as those numbered 19 at the ends of mandrel 11. In these shoulders, we have provided passages for the connection of an exhaust tube such as 18 or for electrode output tubes 17 and 20. All of these tubes quite clearly run parallel to the axis of mandrel 11. Finally we have an outside sleeve 16 which covers the entire assembly and which, along its inside surface, is welded onto helicoidal wall 13 and onto shoulders such as those at 19.

Figure 2:
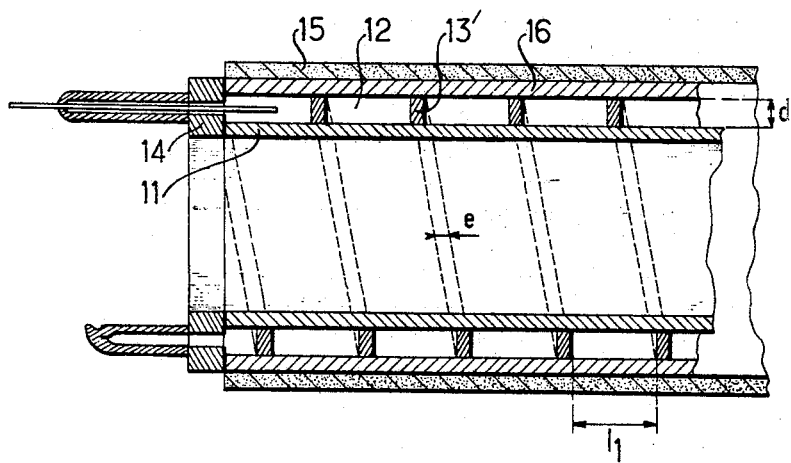
FIGURE 2 is an axial cross section of another possible version of the tube covered by this invention.

The flash tube shown in a longitudinal cross section in FIGURE 2 is similar to the one in FIGURE 1 as far as its outside appearance is concerned. This tube, however, is different by virtue of the fact that, in accordance with this invention, the dimensions are so designed that the thickness $d$ of the helicoidal conduit is quite definitely smaller than the width $l_1$ and preferably smaller than or equal to $l_1/3$. In this case, the helicoidal conduit 12 is obtained, not by means of grinding or brazing a mandrel, but by taking a glass or quartz rod 13' and winding it in spiral form around this mandrel; this rod has a very definite rectangular cross section and a thickness $e$ which is quite clearly less than $l_1$ and preferably quite a bit less than $d$. This spiral rod is welded along its crest to the surface of mandrel 11 and the entire assembly is then inserted into sleeve 16 whose inside surface is welded against the crest of the spiral 13' by means of heating through the outside. This tube ends in two terminal rings such as those at 14; these end rings are welded onto mandrel 11 and onto sleeve 16 and the outside surface of sleeve 16 is covered by a layer 15 of light-diffusing material, for example, magnesium oxide.

The tube described in connection with FIGURES 1 and 2 perfectly well meets the requirements mentioned above under (a) and (b).

Let us now show that the impedance can easily be accomplished here, under these adaptation conditions, contrary to the case of the helicoidal tube or the coaxial tube.

We can calculate the impedance by applying the relationship $R = l/S$ $l$ here is the length of the electric arc,
L here is the longitudinal dimension of the tube,
D is its average diameter,
$d$ is the thickness of the plasma,
$n$ is the number of spirals, and
$\tau$ is the specific resistance of the plasma.

Figure 3:
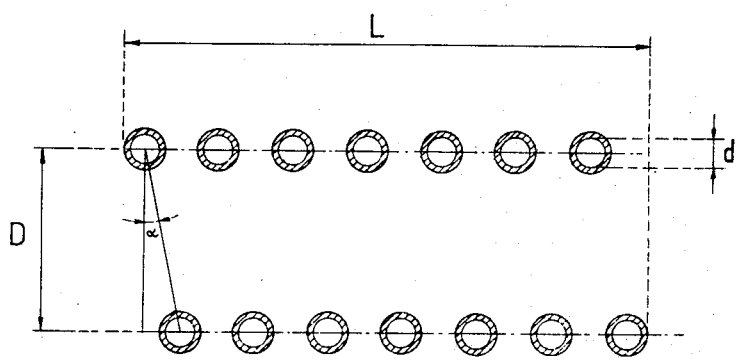
FIGURES 3, 4 and 5 are schematic axial cross sections, respectively, for a helicoidal tube, a coaxial tube, and a tube described in this particular invention; these figures will give the reader a better idea of the characteristics of each of these tube types.

For the helicoidal flash tube (FIGURE 3) we have the following:

$$R = \tau \frac{l}{S} \quad l = \frac{n\pi D}{\cos \alpha} \quad S = \frac{\pi d^2}{4}$$

$$R_H = \frac{\tau 4nD}{d^2 \cos} = \frac{\tau 4nD}{d^2 \cos \alpha}$$

$$R_H = \frac{\tau 4nD}{d^2 \cos \alpha}$$

Figure 4:
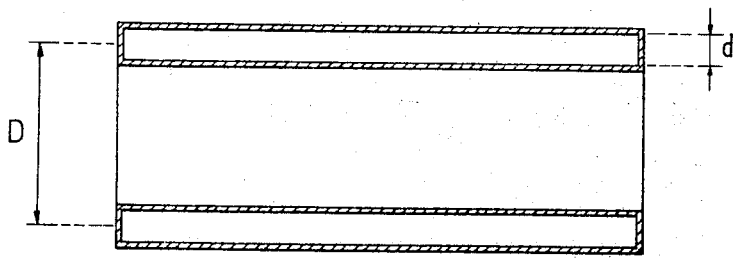

For the coaxial flash tube (FIGURE 4) we have the following:

$$1 = L \quad S = \frac{\pi}{4}\ (D+d)^2 - (D-d)^2 = \pi D d$$

$$R_c = \tau \frac{L}{\pi D d}$$

Figure 5:
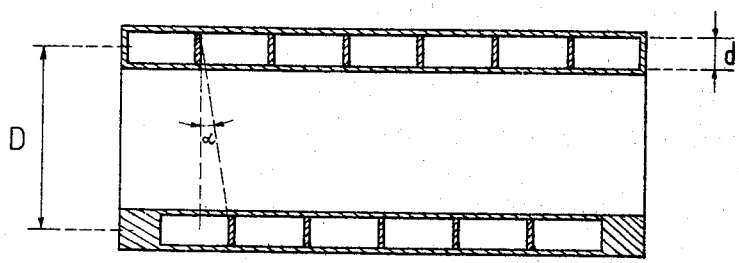

For the new structure (FIGURE 5) we have the following:

$$l = \frac{n\pi D}{\cos \alpha} \quad S = l_1 \times d \quad l_1 = \frac{L}{n+1}$$

$$R_{Hc} = \frac{\tau n \pi D (n+1)}{L \cos \alpha}$$

To define the dimensions, we use the following relationships:

$$L = 6D \quad d = \frac{D}{6} \quad L = 36d \quad n = \frac{L}{2d} = 18$$

If, under these conditions, we look for the ratio between the resistance of the helicoidal source and the resistance of the coaxial source, we get the following:

$$\frac{R_H}{R_c} = \frac{\frac{\tau 4nD}{d2 \cos \alpha}}{\tau \frac{L}{\pi D d}} = \frac{4nD^2 \pi d}{L d^2 \cos \alpha} = \frac{4 \times 18 \times \pi}{\cos \alpha}$$

Since $\cos \alpha \neq \neq 1$, we finally get $$\frac{R_H}{R_c} \neq \neq 225$$

this shows us that these two types of sources are very different from the viewpoint of the impedance and are placed at two ends of the scale, one being much too weak (coaxial), and the other one being too strong (helicoidal).

Mathematical example

Let us take the following dimensions here: $L = 300$ mm., $D = 50$ mm., $d = 8$ mm.; this would apply for the evacuation of a laser bundle with a length of 250 mm. and a diameter of 32 mm.; let us then assume that we have $\tau = 2.8 \cdot 10^{-2} \Omega/$cm., which would correspond to a current density J amounting to 2,500 a./cm.$^2$; we thus get a value for $R_H$ which looks like this:

$$R_H = \frac{\tau 4nD}{d^2 \cos \alpha} = 2.8 \cdot 10^{-2} \times \frac{4 \times 18 \times 5}{(0.8)2} = 15.7 \Omega$$

whereas we get the following for $R_c$:

$$R_c = \tau \frac{L}{\pi D d} = 2.8 \cdot 10^{-2} \times \frac{30}{3.14 \times 5 \times 0.8} = 6.720^{-2} \Omega$$

In the case of the new-structure source for $L = 300$ mm., with a pitch of 32 mm. (or 30 mm. that can be used per spiral), and with $n=8$ spirals, the resistance is as follows, under the same conditions:

$$\tau = 2.8 \cdot 10^{-2} \Omega \text{ cm.} \quad l = \frac{n\pi D}{\cos \alpha} \quad \tan \alpha = \frac{50}{16} \tau = 17°75$$

where $l = \frac{8 \times 3.14 \times 5}{0.948} = 132.5$ cm. $S = d \times h = 0.8 \times 3$ $$= 2.4 \text{ cm.}^2$$

$$R_{Hc} = 2.8 \cdot 10^{-2} \times \frac{132.5}{2.4} = 1.55 \Omega$$

This resistance value is very close to the value corresponding to the critical attenuation in a discharge using conventional values for L and C (for example, in the case where $L=250$ μh. and $C=400$ μf., the critical impedance is 0.8Ω, that is to say, half of the value obtained for $RH_c$. This resistance $RH_c$ is sufficiently high to make sure that all of the energy delivered by the discharge circuit LC is effectively dissipated into the tube.

What is claimed is:

1. A laser flash tube of the type having a helicoidal conduit comprising a first hollow cylindrical tube, a second hollow cylindrical tube having a larger diameter than said first tube and disposed in concentric spaced relation to said first tube and helicoidal wall means disposed between and joining said tubes along the length thereof wherein the thickness of said wall delimiting two consecutive spirals and the radial distance between said tubes are substantially smaller than the distance between turns of said helicoidal wall in a direction parallel to the axis of said tubes.

2. A flash tube as set forth in claim 1 wherein said wall means is made of transparent material and is composed of a separate strip having a rectangular cross section wound in spiral fashion around said first tube and welded along its length to the outside surface of said first tube and the inside surface of said second tube.

3. A flash tube as set forth in claim 1 wherein the space between said tubes is sealed at opposite ends by means of two transversal plates in the form of an annular ring, said plates being welded to ends of said first and second tubes and further comprising electrical connection means extending through said rings parallel to the axis of said tubes into the space between said tubes.

4. A flash tube as set forth in claim 1 further comprising a layer of diffusing material covering the outer surface of said second tube.

5. A flash tube as set forth in claim 4 wherein said layer is magnesium oxide.

6. A flash tube as set forth in claim 1 wherein said helicoidal conduit has a rectangular cross section the long side of which is parallel to the axis of said tubes and is at least three times the length of the short side.

References Cited

UNITED STATES PATENTS 3,121,183  2/1964  Swanson _____ 313—204

FOREIGN PATENTS 906,947  6/1945  France.
906,245  1/1954  Germany.

JAMES W. LAWRENCE, Primary Examiner

E. R. LA ROCHE, Assistant Examiner

U.S. Cl. X.R.

313—116, 220